(12) United States Patent
Townsend et al.

(10) Patent No.: US 7,657,923 B2
(45) Date of Patent: Feb. 2, 2010

(54) FRAMEWORK FOR A SECURITY SYSTEM

(75) Inventors: Steven Townsend, Seattle, WA (US); Thomas Fakes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 10/898,463

(22) Filed: Jul. 23, 2004

(65) Prior Publication Data
US 2006/0021002 A1 Jan. 26, 2006

(51) Int. Cl.
H04L 29/06 (2006.01)
(52) U.S. Cl. .......................................................... 726/1
(58) Field of Classification Search .................. 726/1
See application file for complete search history.

(56) References Cited

U.S. PATENT DOCUMENTS

| | | | |
|---|---|---|---|
| 5,361,359 A | | 11/1994 | Tajalli et al. |
| 5,386,564 A | * | 1/1995 | Shearer et al. ............... 707/101 |
| 5,915,085 A | | 6/1999 | Koved |
| 5,958,050 A | * | 9/1999 | Griffin et al. .................... 726/1 |
| 5,991,877 A | * | 11/1999 | Luckenbaugh .................. 726/1 |
| 6,070,244 A | * | 5/2000 | Orchier et al. .................. 726/1 |
| 6,301,669 B2 | * | 10/2001 | Boden et al. .................... 726/1 |
| 6,405,212 B1 | | 6/2002 | Samu et al. |
| 6,484,261 B1 | | 11/2002 | Wiegel |
| 6,646,195 B1 | | 11/2003 | Puryear |
| 7,072,967 B1 | * | 7/2006 | Saulpaugh et al. ........... 709/229 |
| 7,296,154 B2 | | 11/2007 | Evans et al. |
| 2002/0019935 A1 | | 2/2002 | Andrew et al. |
| 2002/0123966 A1 | | 9/2002 | Chu et al. |
| 2003/0177129 A1 | | 9/2003 | Bond et al. |
| 2003/0229805 A1 | * | 12/2003 | Perry ......................... 713/200 |
| 2004/0060425 A1 | | 4/2004 | Puryear |
| 2004/0064727 A1 | * | 4/2004 | Yadav ........................ 713/201 |
| 2004/0123188 A1 | | 6/2004 | Srinivasan et al. |
| 2004/0143736 A1 | | 7/2004 | Cross et al. |
| 2004/0193718 A1 | * | 9/2004 | Huang et al. ................. 709/229 |
| 2004/0250127 A1 | * | 12/2004 | Scoredos et al. ............. 713/201 |
| 2005/0010819 A1 | * | 1/2005 | Williams et al. ............. 713/201 |
| 2005/0028006 A1 | * | 2/2005 | Leser et al. .................. 713/200 |
| 2005/0125685 A1 | | 6/2005 | Samuelsson et al. |
| 2005/0246522 A1 | | 11/2005 | Samuelsson et al. |
| 2006/0005227 A1 | | 1/2006 | Samuelsson et al. |

(Continued)

OTHER PUBLICATIONS

U.S. Appl. No. 10/836,810, filed Apr. 30, 2004, Samuelsson et al.

(Continued)

Primary Examiner—Jacob Lipman
(74) Attorney, Agent, or Firm—Perkins Coie LLP

(57) ABSTRACT

A framework for a security system is described. The framework may be used to track which security engines are available to enforce security policies. A security engine is a software resource that enforces security policies designed to help ensure that a vulnerability of an application or operating system cannot be exploited. The framework may be used to maintain a holistic view of a status of computing devices that a security system is configured to operate with. The framework may enforce security policies uniformly across components of a security system by providing an application program interface. The security system may broker security enforcement events and security policies. By providing these services, the framework presents a unified model for interactions between software components and the security system.

6 Claims, 6 Drawing Sheets

U.S. PATENT DOCUMENTS

| | | |
|---|---|---|
| 2006/0021002 A1 | 1/2006 | Townsend et al. |
| 2006/0048209 A1 | 3/2006 | Shelest et al. |
| 2006/0161965 A1 | 7/2006 | Shelest et al. |
| 2006/0282876 A1 | 12/2006 | Shelest et al. |

OTHER PUBLICATIONS

U.S. Appl. No. 10/882,438, filed Jul. 1, 2004, Samuelsson et al.

Yolanta Beres and Chris I. Dalton, "Dynamic Label Binding at Run-Time," New Security Paradigms Workshop 2003, Ascona, Switzerland, ACM 2004 (8 pages).

Sushil Jajodia, et al., "A Unified Framework for Enforcing Multiple Access Control Policies," SIGMOD '97 Arizona, ACM 1997 (12 pages).

Emin Gun Sirer and Ke Wang, "An Access Control Language for Web Services," SACMAT '02, Monterey, California, Jun. 3-4, 2002 (8 pages).

\* cited by examiner

FRAMEWORK FOR A SECURITY SYSTEM

TECHNICAL FIELD

The described technology relates generally to operating systems and, more particularly, to a framework for a security system.

BACKGROUND

Users of application programs or operating systems sometimes inadvertently install software resources that misbehave or are malicious. Software resources include, e.g., application programs, user interfaces, device drivers, network protocol stacks, and other electronic information. As an example, users may install an application program that provides desirable functionality but may be infected with a virus that produces undesirable results. As a further example, the installed application program may be a Trojan horse. A Trojan horse is a program that provides useful functionality and otherwise appears to be innocuous, but is designed to be malicious or provide results unintended by its use. Indeed, any software resource may inadvertently behave in unintended ways because of programming errors, conflicts with other software resources, or a variety of other reasons.

When a software resource misbehaves or performs malicious activities, it may cause a variety of problems for users, other software resources, and an operating system that may be managing and coordinating multiple software resources. It would thus be highly desirable to provide a framework for a security system that reduces a likelihood of such problems.

SUMMARY

A framework for a security system is described. The framework may be used to track which security engines are available to enforce security policies. A security engine is a software resource that enforces security policies designed to help ensure that a vulnerability of an application or operating system cannot be exploited. The framework may be used to maintain a holistic view of a status of computing devices that a security system is configured to operate with. The framework may enforce security policies uniformly across components of the security system by providing an application program interface. The security system may broker security enforcement events and security policies. By providing these services, the framework presents a unified model for interactions between software components and the security system.

DETAILED DESCRIPTION

Figure 1:
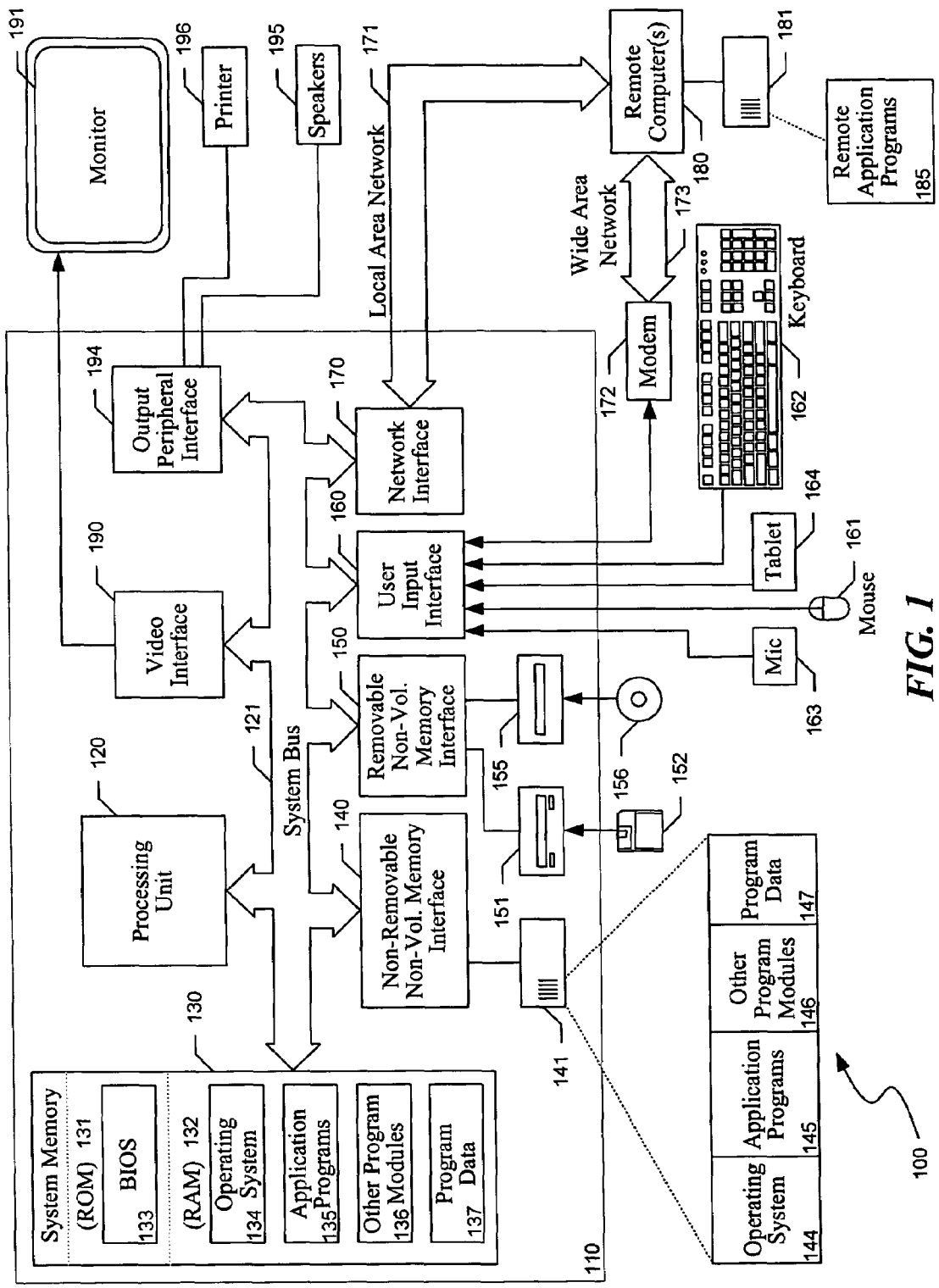
FIG. 1 is a block diagram illustrating components of a computing system suitable for embodiments of the described system.

A framework for a security system ("the framework") is described. The framework may be used in a number of ways in relation to components of the security system, including security engines and host services components. As an example, the framework may be used to track which security engines are available to enforce security policies. As a further example, the framework may be used to maintain a holistic view of a status of computing devices that a security system is configured to operate with. A security engine is a software resource that enforces security policies designed to help ensure that a vulnerability of an application or operating system cannot be exploited. A host services component may configure or coordinate security engines and perform other services in relation to security engines and a computing device for which the security system enforces security policies.

In some embodiments, the framework enforces security policies uniformly across components of a security system by providing an application program interface ("API"). The API comprises multiple features such as methods, events, and properties that are used to register and unregister security engines and to provide other functionality relating to the security system. By using features of the framework's API, the security system may, e.g., be notified of additions of security engines, removal of security engines, and changes to security engines. Then, when the security system starts, when a security policy is added, removed, or modified, or in other circumstances, a host services component of the security system determines which security engines are available or should be notified. By determining which security engines are available, the host services component determines which security engines to start, to which security engines various security policies should be communicated, and which security engines should be reconfigured, e.g., based on changes to security policies. Thus, the security system uniformly enforces security policies across components of a security system.

In some embodiments, the framework enables the security system to present a holistic view of computing devices on which the security system operates. As an example, while a virus detection system presents information relating to viruses and a firewall system may present information relating to a firewall, the security system may be able to present information relating to viruses, the firewall, and other security features for which security engines are operating on the computing device.

In some embodiments, the security system presents this holistic view by brokering security enforcement events and security policies. Brokering involves collecting and assembling information at an information source and making the information available from the information source. The brokering is done by a host services component of the security system. By brokering security enforcement events, the host services component may be able to provide the assembled information to an application that in turn provides the assembled information to users. By brokering security policies, the host services component may be able to provide an appropriate subset of a security policy to associated security engines.

Techniques designed to prevent these problems by securing applications and operating systems are described in commonly assigned co-pending patent application Ser. No. 10/836,810, entitled "SECURING APPLICATIONS AND OPERATING SYSTEMS," which is hereby incorporated herein in its entirety by reference. The following discussion provides an overview of the technology described in this co-pending patent application.

In some embodiments of the technology disclosed in the co-pending patent application, a security engine enforces security policies that help to ensure that a vulnerability of the operating system cannot be exploited. A security policy comprises indications of security enforcement events and security enforcement actions. A security enforcement event is an event for which a security policy is defined. As examples, security enforcement events could be sending or receiving a certain type of message at a network port, a request to modify an executable file, and a request to format a hard disk. A security enforcement action is an action specified in a security policy relating to the security enforcement event. As examples, security enforcement actions may include, e.g., allowing the event, denying the event, notifying a user, or requesting input from a user.

Security engines may respond to security enforcement events by performing various security enforcement actions. Examples of enforcement actions taken by security engines include, but are not limited to, protection against electronic viruses, authorization of network access, detection of intrusion by unauthorized users or software resources, detection of outdated software resources, automatic "lockdown" of software resources (e.g., in response to a signal from an administrator), and general blocking of undesirable behavior by users and software resources.

Security engines may receive security policies from a host services component. A host services component performs a variety of tasks including coordination of security engines and communication of security policy information. The host services component also may load, unload, and configure security engines.

The host services component may need to be aware of security engines that are available or unavailable to receive security policy information, or can be configured in other ways. Security engines may be added to a security system after the security system is configured. Security engines may also thereafter be removed or reconfigured, such as when security policies are added, removed, or revised.

Turning now to the figures, FIG. 1 illustrates an example of a suitable computing system environment 100 in which the framework may be implemented. The computing system environment 100 is only one example of a suitable computing environment and is not intended to suggest any limitation as to the scope of use or functionality of the framework. Neither should the computing system environment 100 be interpreted as having any dependency or requirement relating to any one or combination of components illustrated in the exemplary computing system environment 100.

The framework is operational with numerous other general-purpose or special-purpose computing system environments or configurations. Examples of well-known computing systems, environments, and/or configurations that may be suitable for use with the framework include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The framework may be described in the general context of computer-executable instructions, such as program modules, being executed by a computer. Generally, program modules include routines, programs, objects, components, data structures, and so forth, which perform particular tasks or implement particular abstract data types. The framework may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the framework includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media and removable and non removable media. By way of example, and not limitation, computer-readable media may comprise computer storage media and communication media. Computer storage media includes volatile and nonvolatile, removable and non removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 110. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162, and a pointing device 161, commonly referred to as mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, a game port, or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computer 110 is incorporated, such as in a tablet-type personal computer. In addition, computers such as the computer 110 may also include other peripheral output devices such as speakers 195 and a printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet. For example, in the present framework, the computer 110 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on the memory device 181. It will be appreciated that the network connections shown are exemplary, and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the framework, one of ordinary skill in the art will appreciate that the framework may be implemented using devices of various types and configurations, and having various components.

Figure 2:
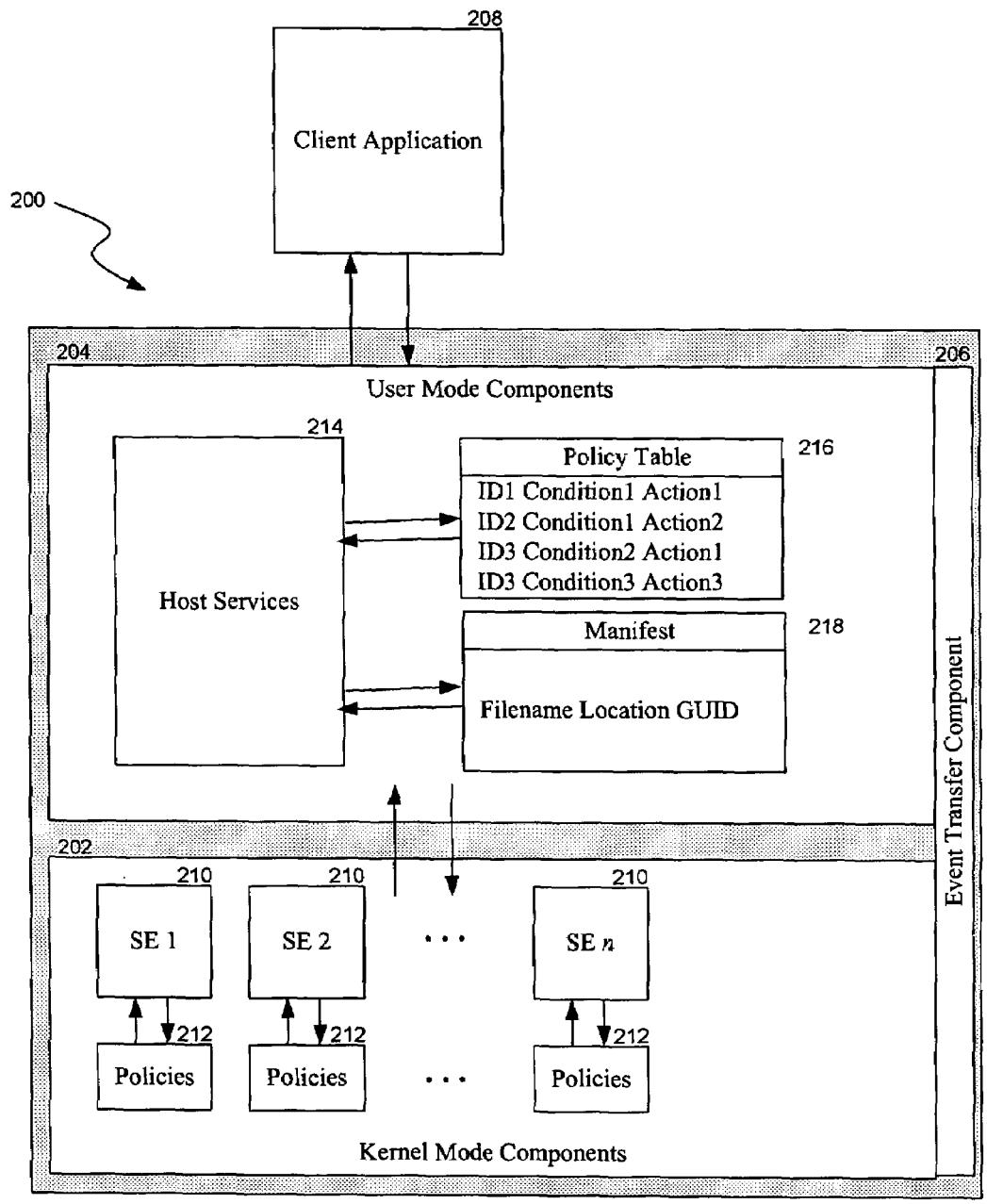
FIG. 2 is a block diagram illustrating components of a security system in some embodiments.

FIG. 2 is a block diagram illustrating components of a security system in some embodiments. The security system comprises kernel mode components 202, user mode components 204, an event transfer component 206 such as Event Tracing for WINDOWS for transferring events from the kernel mode components to user mode components, and a client application program 208. The event transfer component can operate asynchronously or synchronously. Components other than Event Tracing for WINDOWS can be used for communications between user mode and kernel mode components including, e.g., application program interface calls, sockets, etc.

The system also includes security engines 210 and related policy tables 212. In some embodiments, a security engine 210 may have a user mode portion and a kernel mode portion that communicate with one another to perform the various activities relating to the security engine. Each related policy table contains rules referenced by a security engine. Alternatively, the security engines may use one policy table or several policy tables and, in such a case, the table(s) would identify for which security engine(s) policies are indicated.

The system further includes a host services component 214 and a related security policy table 216. The security policy table contains rules relating to security policies and data associated with the rules.

The system also includes one or more manifests 218. Manifests may identify information relating to security engines. As examples, manifests may identify a filename and location of a file (e.g., a dynamic link library) that performs computing steps relating to the security engine. The manifests may also have a globally unique identifier ("GUID") associated with the security engine. In some embodiments, a manifest may be associated with multiple security engines. Alternatively, a security system may have multiple manifests, each associated with a security engine. In some embodiments, the manifests may be digitally signed. In some embodiments, the manifests may be stored as files or in a registry or, indeed, in any computer readable medium.

The kernel mode components, user mode components, and event transfer component are typically all contained in an operating system 200. The operating system operates with the computing system environment 100.

Figure 3:
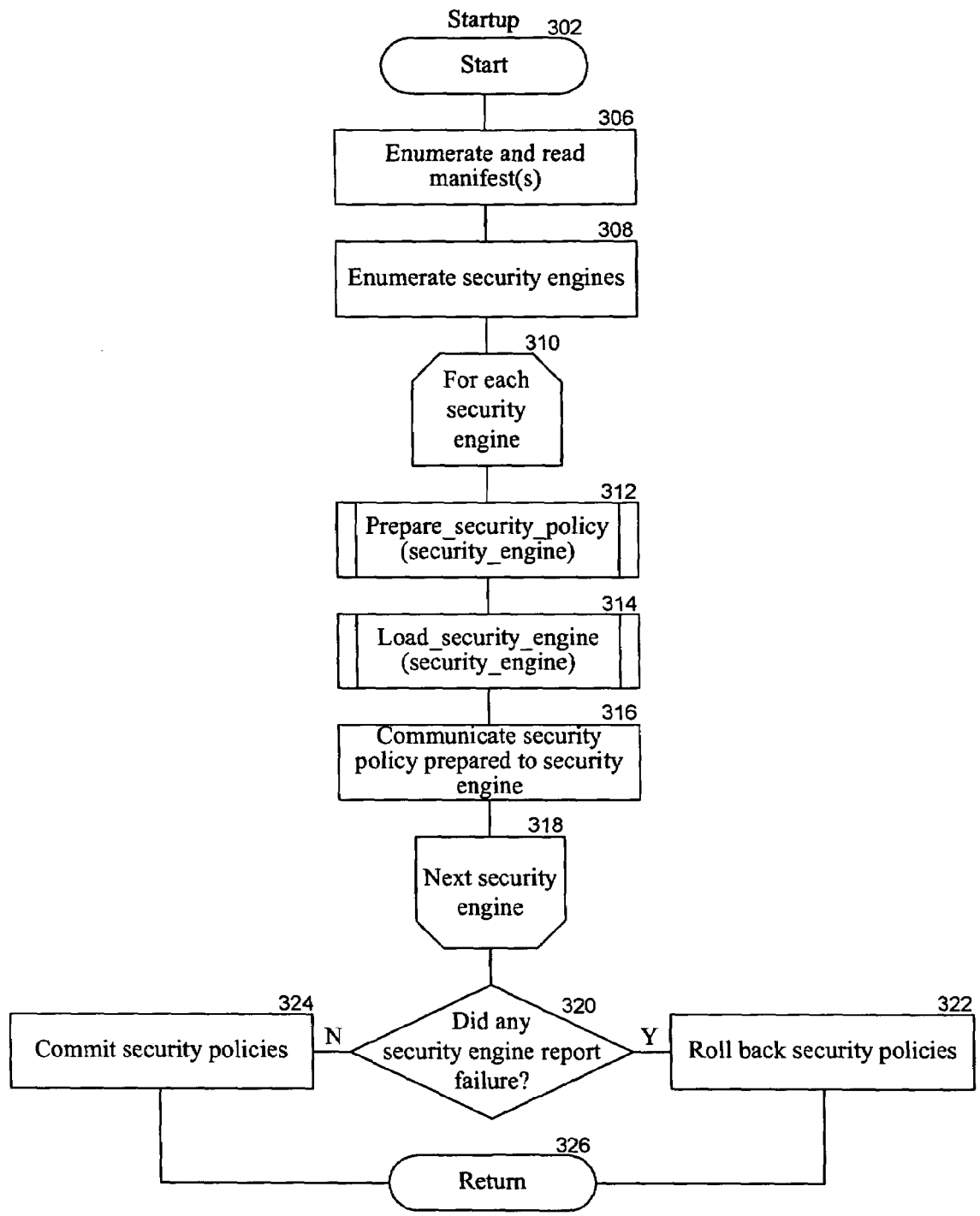
FIG. 3 is a flow diagram illustrating a startup routine of the security system in some embodiments.

FIG. 3 is a flow diagram illustrating a startup routine of the security system in some embodiments. A host services component performs the routine when the security system is started. The routine begins at block 302.

At block 306, the routine enumerates and reads manifests. A manifest is described above in relation to FIG. 2 and block 218. A security system may have one or more manifests. In some embodiments, a security system has a manifest for each security engine. Upon reading a manifest, the host services component may be able to determine information relating to security engines. As examples, the host services component may be able to determine a file name, location, GUID, and other attributes relating to security engines.

At block 308, the routine enumerates the security engines. Enumerating security engines may include traversing one or more manifests to determine a list of indicated security engines. In some embodiments, the routine may enumerate security engines by reviewing a registry or files stored in secondary storage (e.g., hard disk).

Between blocks 310 and 318, the routine loops through security engines and performs a number of functions for each security engine. At block 312, the routine calls a prepare_security_policy subroutine to prepare a security policy for each security engine. This subroutine is described in further detail below in relation to FIG. 5. The host services component may call the prepare_security_policy subroutine asynchronously, and if it does not return in a timely manner, the host services component may determine that the security system cannot start. In some embodiments, a security engine performs the prepare_security_policy subroutine. In such a case, before the security engine returns from the call to the subroutine (e.g., when another security engine sends a failure—see below for further details relating to failures), the host services component may send a signal to the security engine performing the prepare_security_policy subroutine to roll back the security policy. In some embodiments, the call to roll back security policies may be performed asynchronously. This call may be performed asynchronously so that a host services component does not need to be held up by the processing that security engines may perform when rolling back security policies. At block 314, the routine calls a load_security_engine subroutine to load each security engine. This subroutine is described in further detail below in relation to FIG. 4.

At block 316, the routine communicates the prepared security policy to each security engine.

At block 320, the routine determines whether any of the security engines to which a prepared security policy was communicated reported a failure. A security engine may report a failure when, e.g., it is unable to start, it is unable to receive the security policy communicated to it by the host services component, or it fails for a variety of other reasons. If a security engine reports a failure, the routine continues at block 322. Otherwise, the routine continues at block 324 where it signals the security engines to commit the security policies that the host services component previously communicated to the security engines. At block 322, the host services component signals security engines to roll back the security policies that the host services component previously communicated to the security engines. In some embodiments, the routine instructs each security engine to commit its security policies sequentially. In such a case, the routine sends a signal to a security engine and synchronously waits for the security engine to commit its security policy before signaling the next security engine. When a catastrophic failure occurs (e.g., when there is a communications failure between a user and kernel mode portions of a security engine), the host services component may attempt to reload a prior security policy. After either blocks 322 or 324, the routine returns at block 326.

Figure 4:
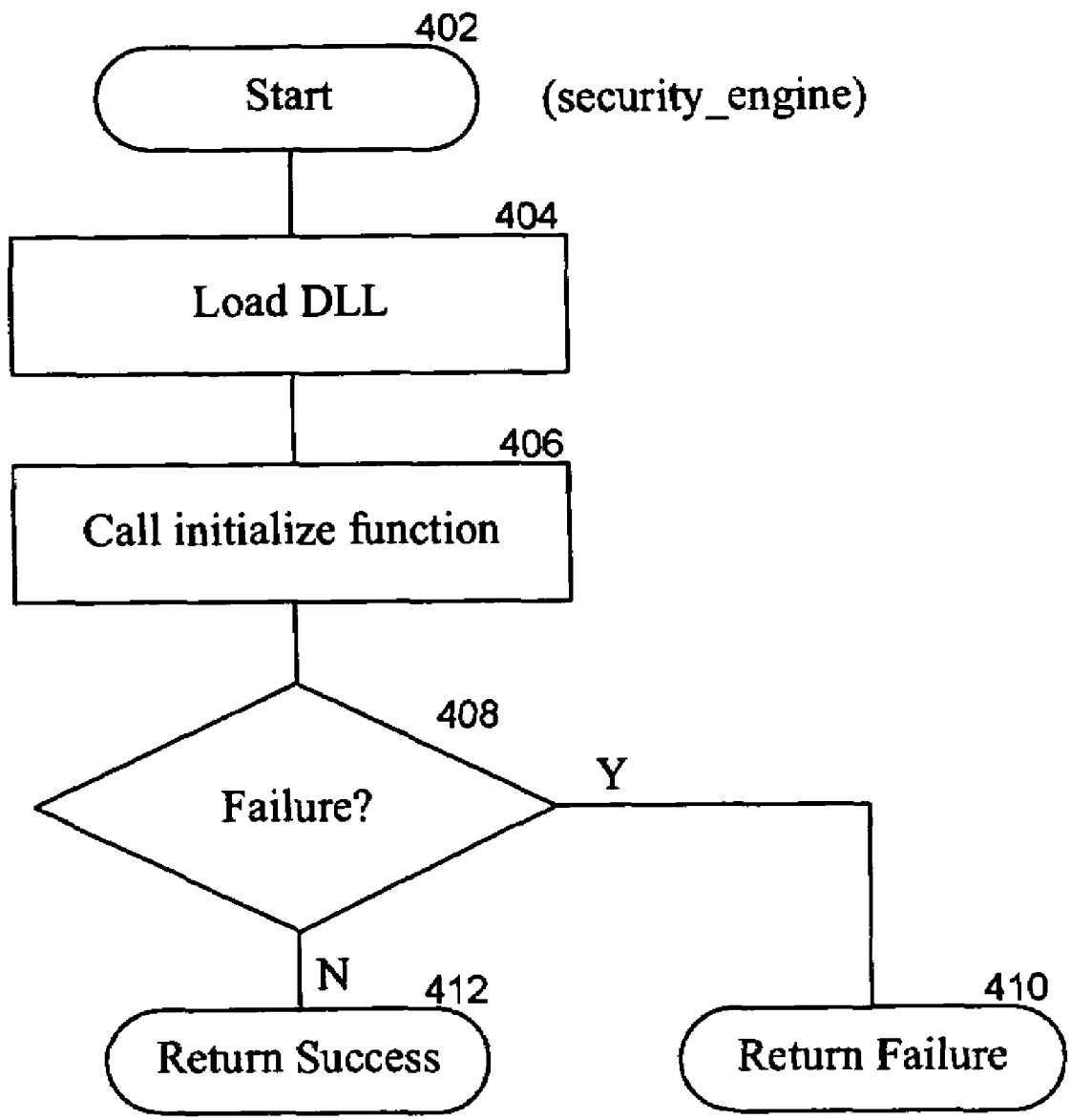
FIG. 4 is a flow diagram illustrating a load_security_engine routine of the security system in some embodiments.

FIG. 4 is a flow diagram illustrating a load_security_engine routine of the security system in some embodiments. A host services component may perform this routine when it is attempting to load a security engine it has determined is available for enforcing security policies. The routine begins at block 402, where it receives an indication of a security engine as a parameter.

At block 404, the routine loads the dynamic link library ("DLL") associated with the indicated security engine. When a security engine is implemented in a form other than a DLL, an appropriate alternate operating system call may be made to load the security engine.

At block 406, the routine calls an initialize function of the loaded security engine. The initialize function of the security engine initializes the security engine, e.g., to a default state for the security engine. In a default state, the security engine may just be a shell that enforces no security policies. Alternatively, the default state may cause the security engine to perform some default enforcement based on a prior configuration. The host services component may call the initialize function asynchronously for each security engine and may wait for all the calls to complete before continuing (not shown). At block 408, the routine determines whether there was a failure in either loading the security engine or initializing the security engine. A security engine may fail to load or initialize when, e.g., its DLL cannot be found, it has been modified, after being digitally signed, or a number of other reasons.

If there was a failure in loading or initialing the security engine, the routine returns an indication of the failure at block 410. Otherwise, the routine returns an indication of a success at block 412.

Figure 5:
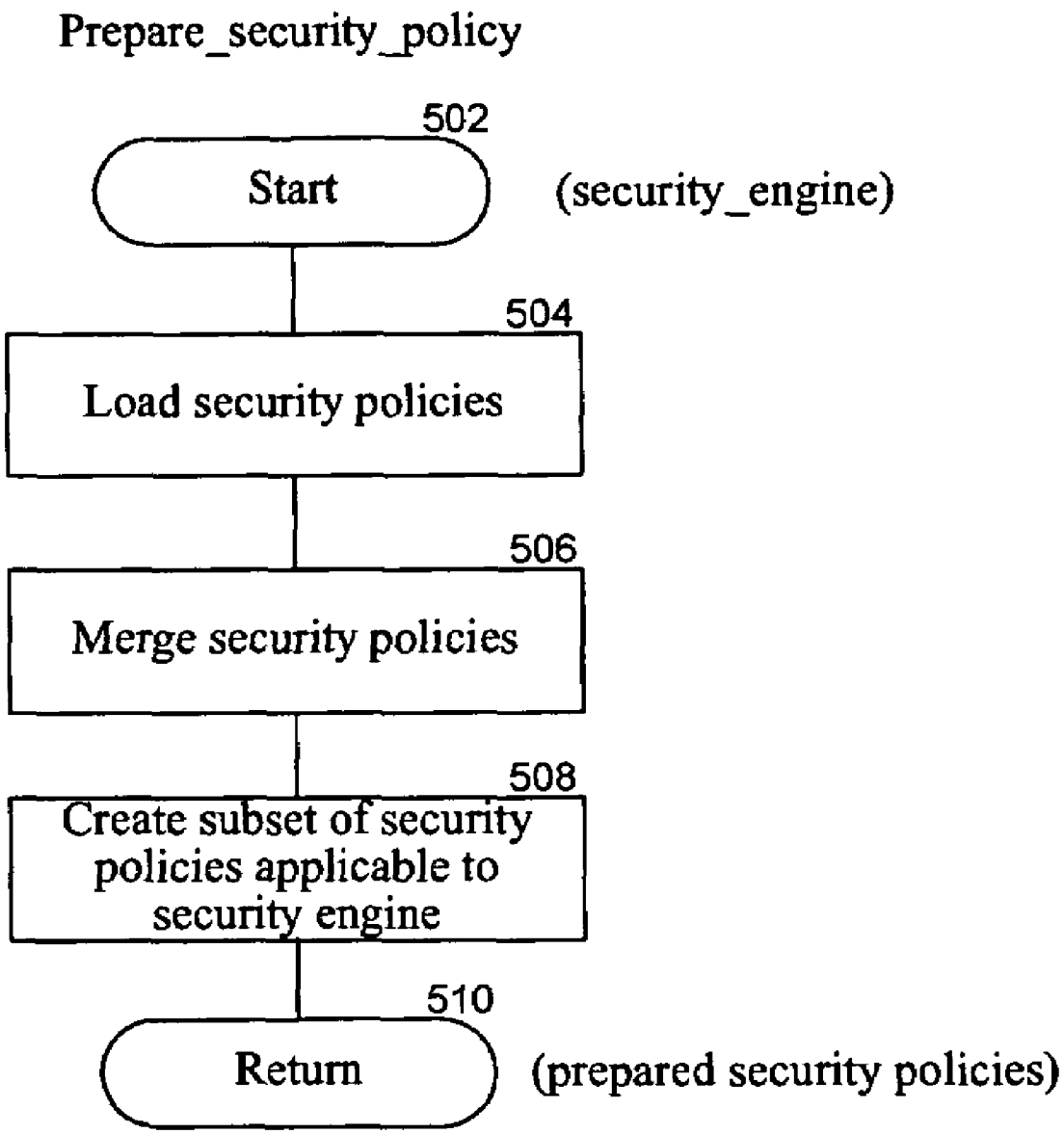
FIG. 5 is a flow diagram illustrating a prepare_security_policy routine of the security system in some embodiments.

FIG. 5 is a flow diagram illustrating a prepare_security_policy routine of the security system in some embodiments. The prepare_security_policy routine may be performed either by a host services component or by a security engine.

The routine begins at block 502. If the routine is performed by a host services component, the routine receives an indication of a security engine as a parameter. However, if the routine is performed by a security engine, the routine does not receive the indication of a security engine as a parameter.

At block 504, the routine loads security policies. The security system may have one or more security policies. The host services component may load the security policy from a storage device directly connected to the computing system associated with the host services component, or it may load the security policy from a storage device accessed via a network. In some embodiments, the routine receives an indication of the security policies. Alternatively, the routine determines a location for the security policies by evaluating a portion of a registry.

At block 506, the routine merges the security policies. Merging the security policies may include combining the security policies into a larger security policy. In some embodiments, security policies may be represented in an extensible markup language ("XML"). When multiple security policies are indicated in XML, merging the security policies may include combining all the security policies into a larger XML stream such that the effect of the individual policies are preserved.

At block 508, the routine determines a subset of the merged security policies that are applicable to either the indicated security engine or the security engine performing the routine (as appropriate). As an example, security policies relating to a network may be applicable to a security engine that enforces network policies. In contrast, security policies relating to checking version numbers of software resources may be inapplicable to a security engine that enforces network policies.

At block 510, the routine returns to its caller the subset of security policies determined at block 508 as prepared security policies.

Figure 6:
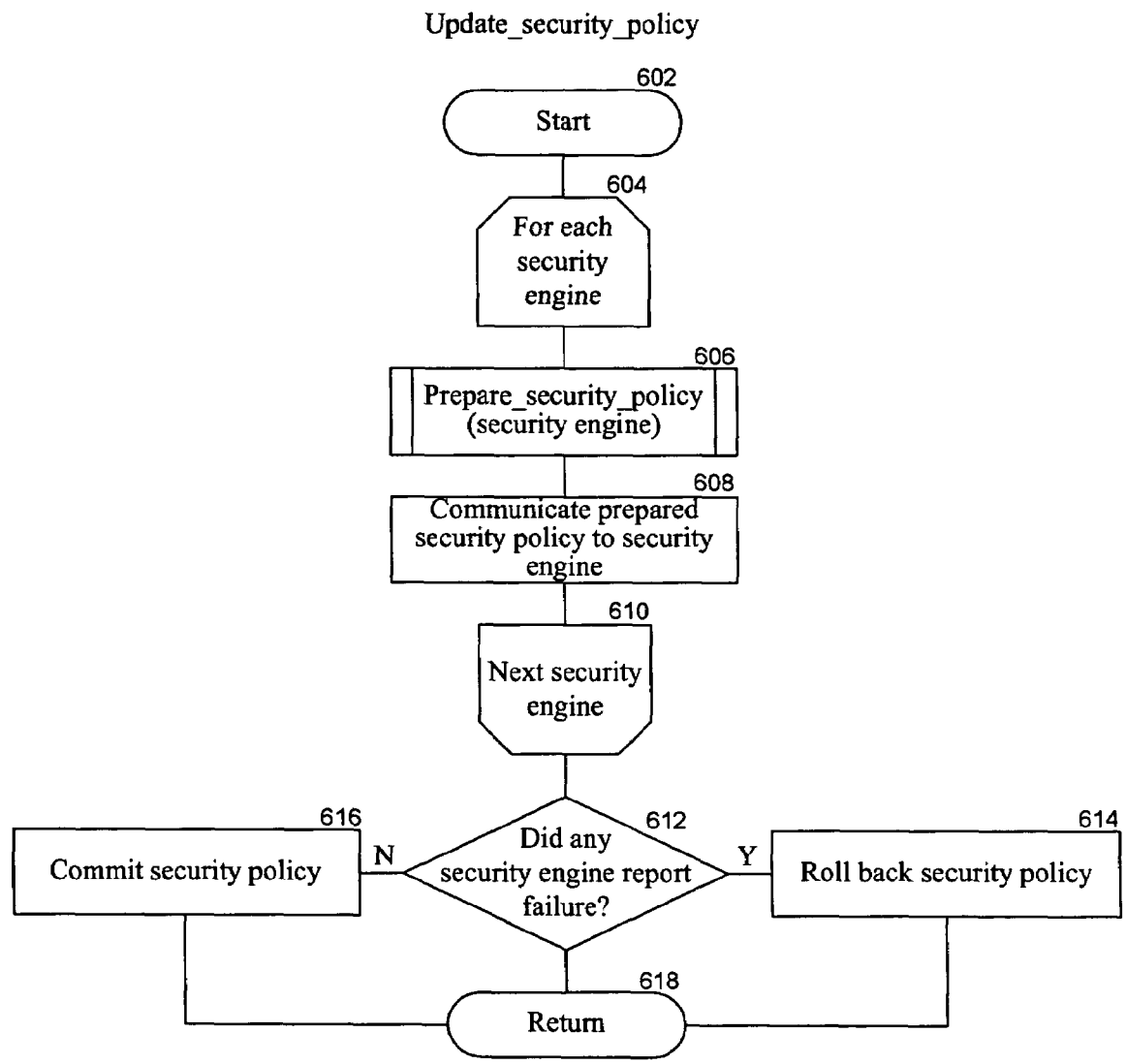
FIG. 6 is a flow diagram illustrating an update_security_policy routine of the security system in some embodiments.

FIG. 6 is a flow diagram illustrating an update_security_policy routine of the security system in some embodiments. The routine may be performed by a host services component when the host services component determines to update a security policy. The host services component may determine to update a security policy when, e.g., it receives a new security policy or an update to a security policy.

The routine begins at block 602. In some embodiments, the routine may receive an indication of a new, updated, or removed security policy.

Between blocks 604 and 610, the routine loops through security engines to update the security engines. At block 606, the routine prepares the security policy for each security engine. The routine prepares the security policy by calling a prepare_security_policy subroutine, which is described above in relation to FIG. 5.

At block 608, the routine communicates the prepared security policy to the security engine.

At block 612, the routine determines whether any of the security engines to which a security policy was communicated reported a failure. If a security engine reported a failure, the routine continues at block 614, where it rolls back the security policy. Otherwise, the routine continues at block 616, where it signals the security engines to commit the security policy.

After either blocks 614 or 616, the routine then returns to its caller at block 618.

In some embodiments, the framework may have a shutdown method that shuts security engines down.

In some embodiments, the framework enables data relating to rules of a security policy to be updated independently from the rules themselves. To support this functionality, the framework supports a number of methods, properties, and events. As an example, a security engine may call a ReadAndRegisterNotifyData method to indicate that the security engine desires to be notified when data indicated in the call to this method changes. As a further example, when the data changes, a host services component may call a WriteData method to change data in such a way that the security engine is notified that the data has changed. Similarly, a WriteConfig method may enable a host services component to distribute configuration data among a subset of security engines in such a way that security engines that have previously called a ReadAndRegisterNotifyConfig method are informed of changes to the data.

Security engines may also change data associated with security policies. When a security engine changes data, it may use a WriteSecurityEngineData method to indicate to other components of the security system that the data is changing. By doing so, a security engine may be able to communicate with another security engine.

Components that have registered to receive notifications of data changes may also be able to call corresponding methods to de-register from receiving notifications.

A security engine may determine to notify a user or query a user. As an example, in response to a rule of a security policy, a security engine may determine to notify a user when an Internet browsing application attempts to communicate over network port 8080. Similarly, a security engine may determine to query a user for an indication of whether a personal finance application should be allowed to send information via network port 8080. When a security engine determines to either notify a user or query the user, the security engine may call a method of the framework to perform these actions. After the security engine has sent a notification to the user, the security engine may continue processing. On the other hand, after a security engine queries a user, the security engine may suspend processing until the user provides a response. The security engine may also time out, and continue processing without the user's response by, e.g., using a default value.

In some embodiments, the security system may monitor manifests and add, modify, or remove security engines dynamically. By dynamically effecting this behavior, the security system may not need to be restarted.

In some embodiments, the security system may be capable of protecting itself through a variety of means, including by ensuring the integrity of manifests, such as by using digital signatures.

In an embodiment, new security engines may be disallowed.

The various methods described above may be implemented with callback routines. As an example, when a method is called, the caller may provide an indication of a method that the called method can use to return an indication of a success or a failure. By doing so, the caller does not need to wait synchronously for the called method to complete before continuing its own processing.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for securing a host computing device, comprising:
   a central processing unit;
   a first component that:
      receives a stream, the stream containing a security policy; and
      for each of a set of two or more security engines,
         prepares a first portion of the security policy relating to a first security engine of the set of two or more security engines;
         prepares a second portion of the security policy relating to a second security engine of the set of two or more security engines;
         communicates the prepared portions of the security policy to the first and second security engines of the set of two or more security engines;
      if the first security engine of the set two or more security engines indicates a failure after receiving the first prepared portion of the security policy but the second security engine of the set of two or more security engines does not indicate a failure after receiving the second prepared portion of the set security policy, causes the second security engine to roll back the second prepared portion of the security policy; and
   one of the security engines of the set that, when none of the security engines indicates a failure after receiving the prepared portion of the security policy, enforces the portion of the security policy it received, wherein the first component and all security engines operate at the host computing device within a single operating system.

2. The system of claim 1 wherein for each security engine of the set, the first component receives a notification from the security engine indicating whether the communicated portion of the policy was accepted and an indication of the failure includes an indication that the communicated portion of the security policy was not accepted.

3. The system of claim 2, further comprising a second component that communicates to the security engines an instruction to commit the communicated portions of the policy only if an indication is received from all security engines that the portion of the policy communicated to the security engines was accepted.

4. The system of claim 3 wherein the first and second components are the same component.

5. The system of claim 2, further comprising a second component that communicates to the security engines an instruction to roll back the communicated portions of the policy if an indication is received from any of the security engines that the portion of the policy communicated to the security engine was not accepted.

6. The system of claim 5 wherein the first and second components are the same component.

* * * * *

UNITED STATES PATENT AND TRADEMARK OFFICE
CERTIFICATE OF CORRECTION

PATENT NO. : 7,657,923 B2
APPLICATION NO. : 10/898463
DATED : February 2, 2010
INVENTOR(S) : Townsend et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Thirtieth Day of November, 2010

David J. Kappos
*Director of the United States Patent and Trademark Office*